United States Patent
Huang

(10) Patent No.: US 7,147,952 B1
(45) Date of Patent: Dec. 12, 2006

(54) METAL-AIR CELL HAVING AN ADJUSTABLE AIR INLET

(75) Inventor: Ming Yu Huang, Tainan (TW)

(73) Assignee: CMC Magnetics Corporation, Taipei (TW)

( * ) Notice: Subject to any disclaimer, the term of this patent is extended or adjusted under 35 U.S.C. 154(b) by 0 days.

(21) Appl. No.: 09/501,602

(22) Filed: Feb. 10, 2000

(51) Int. Cl.
   *H01M 2/04* (2006.01)

(52) U.S. Cl. .......................... 429/27; 429/48; 429/163
(58) Field of Classification Search .......... 429/27, 429/48, 72, 82, 83, 101, 148, 163, 96–100, 429/151, 155
   See application file for complete search history.

(56) References Cited

U.S. PATENT DOCUMENTS

| | | | |
|---|---|---|---|
| 2,468,430 A | * | 4/1949 | Derksen |
| 3,855,000 A | * | 12/1974 | Jammet |
| 4,177,327 A | * | 12/1979 | Mathews et al. |
| 4,262,062 A | * | 4/1981 | Zatsky |
| 4,620,111 A | * | 10/1986 | McArthur et al. |
| 5,362,577 A | | 11/1994 | Pedicini ................ 429/27 |
| 5,837,394 A | * | 11/1998 | Schumm, Jr. |

* cited by examiner

*Primary Examiner*—Gabrielle Brouillette
*Assistant Examiner*—Susy Tsang
(74) *Attorney, Agent, or Firm*—Michael Bednarek; Pillsbury Winthrop Shaw Pittman LLP

(57) ABSTRACT

A metal-air cell having an anode/electrolyte and a cathode includes a container having an upper interior surface and a lower interior surface for housing the anode/electrolyte and the cathode; a spring disposed on the upper interior surface; a cover electrically connected to the cathode, and having at least one recess; and at least one o-ring disposed on the lower interior surface facing the at least one recess. The spring is compressed when a force is applied so that the at least one o-ring and the at least one recess are separated, thereby forming an inlet to introduce air for electrochemical reaction. The spring is expanded when the force is removed so that the at least one o-ring is inserted within the at least one recess to obstruct the air.

6 Claims, 3 Drawing Sheets

500
METAL-AIR CELL HAVING AN ADJUSTABLE AIR INLET

FIELD OF THE INVENTION

The present invention relates to an electrochemical cell. More particularly, it relates to a metal-air cell having a spring for controlling whether the cell is an opened system or a closed system.

DESCRIPTION OF THE RELATED ART

Electrochemical cells, such as metal-air cells, include an air permeable cathode and a metallic anode separated by an aqueous electrolyte. During discharge of a metal-air cell, such as a zinc-air cell, oxygen from the ambient air is converted at the cathode to hydroxide, zinc is oxidized at the anode by the hydroxide, and then water and electrons are released to provide electrical energy.

To operate a metal-air cell, it is necessary therefore to provide a supply of oxygen (air) to the cathode of the cells. Various structures of the metal-air cells have been utilized. For example, U.S. Pat. No. 5,362,577 to Pendicini discloses a metal-air cell with a case having a plurality of openings for exposing the cathode of the metal-air cell to the atmosphere to allow air to pass through for reaction at the cathode.

However, the cathode is constantly exposed to air even when the metal-air cell is not in use. This causes the metal-air cell to discharge, thereby leading to leakage current and a reduction in cell performance and lifetime.

SUMMARY OF THE INVENTION

In view of the above disadvantages, an object of the invention is to provided metal-air cell comprising a spring and o-ring. By the innovation of metal-air cell of the present invention, an adjustable air inlet is formed to control whether the cell is an opened system or a closed system.

The above object is attained by providing a metal-air cell having an anode/electrolyte and a cathode with a separator positioned there-between, said cell comprising: a container having an upper interior surface and a lower interior surface for housing said anode/electrolyte and said cathode; a spring disposed on said upper interior surface; a cover electrically connected to said cathode, and having at least one recess; at least one o-ring disposed on said lower interior surface, facing said at least one recess; wherein said spring is compressed when a predetermined force is applied so that said at least one o-ring and said at least one recess are separated, thereby forming an inlet to introduce air for electrochemical reaction, and said spring is expanded when said predetermined force is removed so that said at least one o-ring is inserted within said at least one recess to obstruct the air.

Furthermore, in the metal-air cell according to the present invention, the predetermined force can be applied by a cell holder.

Furthermore, in the metal-air cell according to the present invention, the container can be a can shaped container.

Furthermore, the metal-air cell according to the present invention can further comprise a gas-permeable membrane disposed around said cathode and along said interior sidewalls to prevent moisture and carbon dioxide from passing the cell. Moreover, the gas-permeable membrane can comprise a hydrophobic material.

The anode is preferably zinc, and the cathode is consists of catalyst such as manganese dioxide.

BRIEF DESCRIPTION OF THE DRAWINGS

The preferred embodiment of the invention is hereinafter described with reference to the accompanying drawings in which.

DESCRIPTION OF THE PREFERRED EMBODIMENTS

Figure 1:
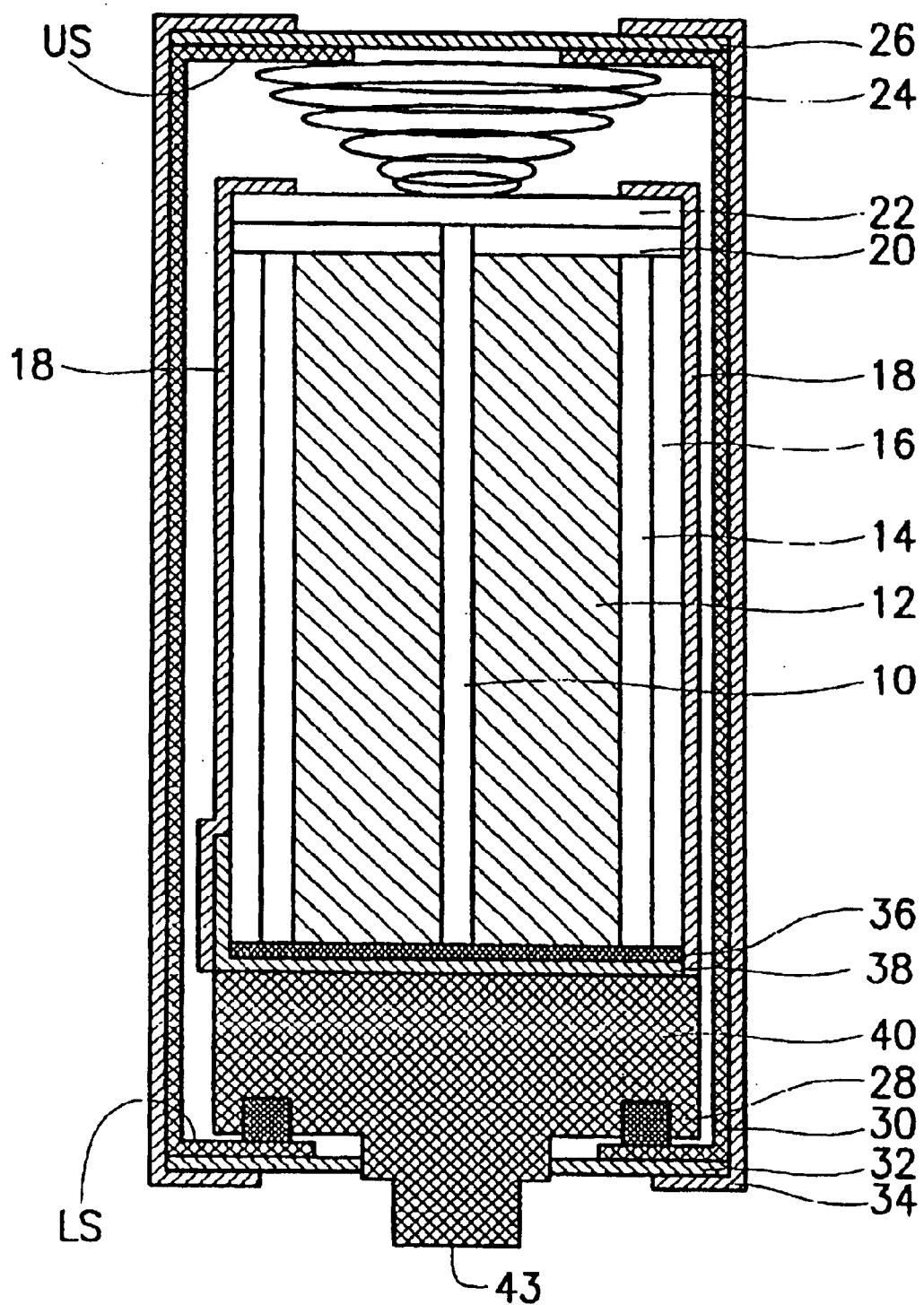
FIG. 1 is a cross-sectional side view of the metal-air cell of the preferred embodiment of the present invention not in use.
Figure 3:
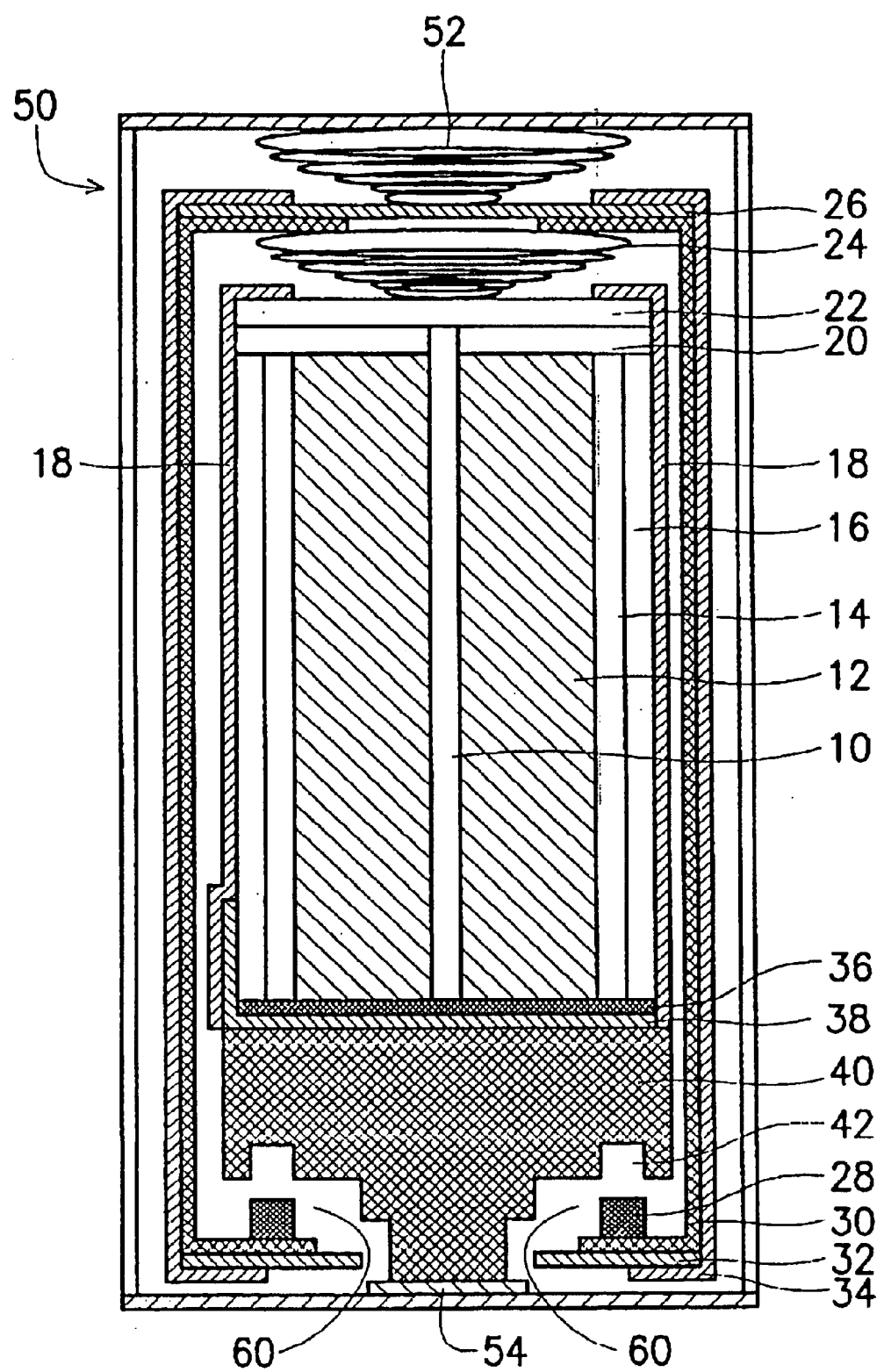
FIG. 3 is a cross-sectional side view of the metal-air cell put in the cell holder shown by FIG. 2.

Referring to FIG.1, and FIG.3, the drawings show a metal-air cell according to an embodiment of the present invention, consisting of an anode/electrolyte 12 and an air cathode 16 with a separator 14 positioned there-between. The metal-air cell can be, for example, a zinc-air cell.

A container 30 having an upper interior surface US and a lower interior surface LS is provided for housing the slurry anode/electrolyte 12 and the air cathode 16 consisting of catalyst and carbon black. In this embodiment, the container 30 is can-shaped; however, it is understood that other shapes can be used. A flexible spring 24 is disposed on the upper interior surface US, between a metal cover 22 and a container 30. A plastic seal 20, preferably polyester, is attached to the anode/electrolyte 12 and the air cathode 16. An electronic conductor 10 is formed within the central portion of the container 30, between the metal cover 22 and the epoxy cover 36, for collecting the current.

An electronic conductor 38 is formed along the epoxy seal 36 and extended along the outer surface of the air cathode 16 to electrically connect with the cathode 16, and collect the current. A cathode cover 40, having a circular recess 42 as shown in FIG. 3 and a tip 43, is attached on the electronic conductor 38. Preferably, a gas-permeable membrane 18 comprising a hydrophobic material such as a polymeric material is disposed around the air cathode 16, between the interior sidewalls of the container 30 and the air cathode 16, thereby preventing electrolyte leakage and/or moisture from exiting the cell. An o-ring 28 is disposed on the lower interior surface LS, wherein the o-ring is aligned with and facing the recess 42. A neutral cover 32 and a metal shrink label 34 are formed to protect the metal-air cell from short and external damages respectively.

Figure 2:
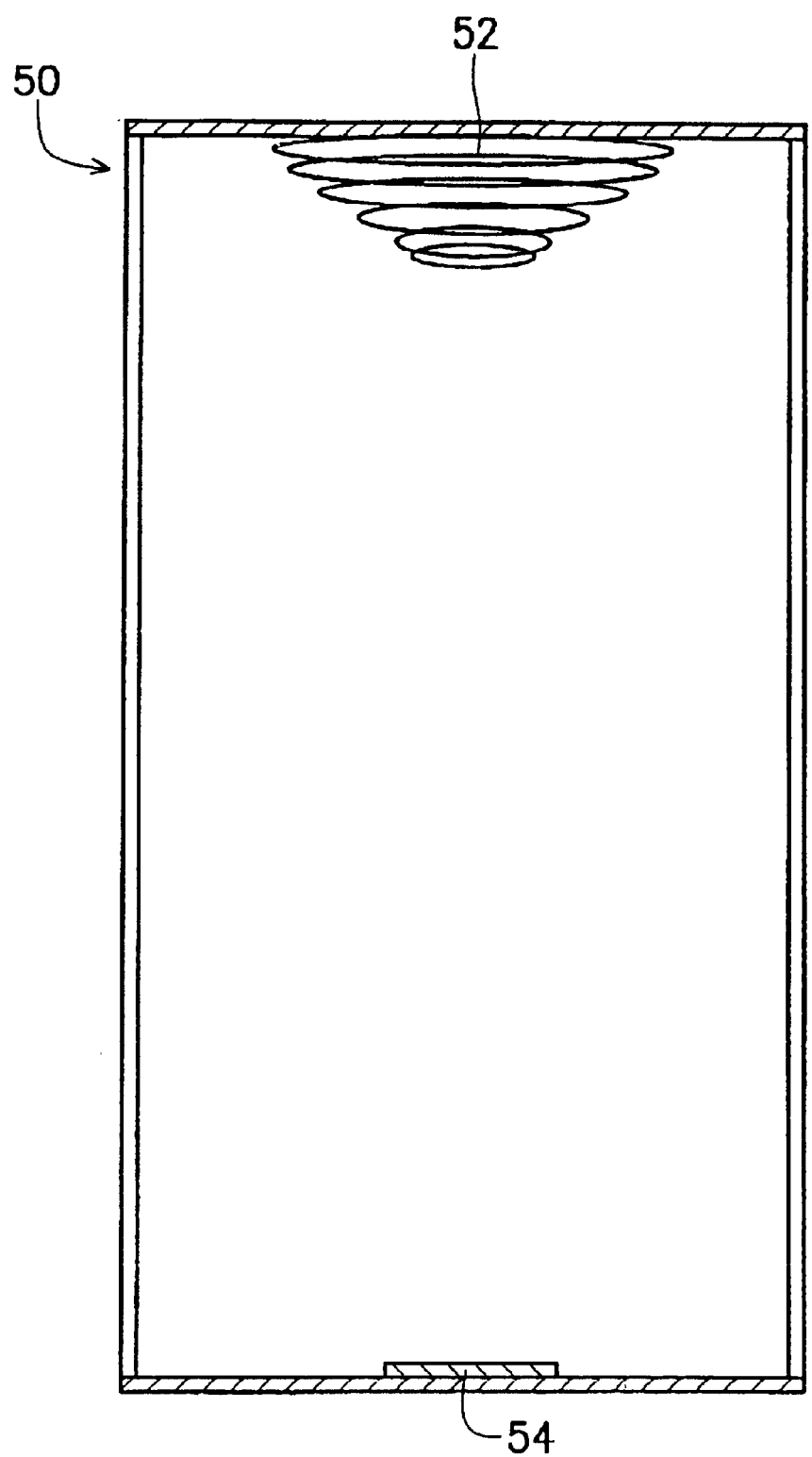
FIG. 2 is a cross-sectional side view of a cell holder suitable for the metal-air cell of the preferred embodiment of the present invention.

FIG. 2 illustrates a cell holder 50 capable of communicating with an external circuit including a holder spring 52 and a support 54. In this embodiment of the invention, support 54 is used to provide a predetermined force on tip 43 when the metal-air cell is placed in cell holder 50. However, it is understood that this predetermined force may come from other sources.

When the metal-air cell is not in use, as shown in FIG. 1, the spring 24 is expanded so that the o-ring 28 is inserted within the circular recess 42, thereby obstructing the passage of air. In this closed system, the cathode is not exposed to air, and therefore the gas transfer is stopped.

When the metal-air cell is placed in the cell holder 50, the predetermined force is applied by support 54 of the cell holder 50 to tip 43 of the metal-air cell. By this means, the spring 24 is compressed so that the o-ring 28 and the recess 42 are separated, thereby forming inlet 60. In this open system, air is introduced through inlet 60 to air cathode 16, allowing for electrochemical reaction to provide electronic energy.

When the metal-air cell is removed from the cell holder 50, the spring 24 is once again expanded so that the o-ring 28 is re-inserted into recess 42 to obstruct air and stop the gas transfer.

According to the of metal-air cell of the present invention, at least one circular recess and corresponding o-ring are provided. However, it is understood that more than one recess and o-ring can be utilized The insertion and removal of the at least one o-ring into the corresponding at least one circular recess closes and opens air inlet 60, thereby controlling whether the system is opened or closed. By this means, the lifetime and performance of the metal-air cell can be improved.

While the invention has been described with reference to various illustrative embodiments, the description is not intended to be construed in a limiting sense. Various modifications of the illustrative embodiments, as well as other embodiments of the invention, will be apparent to those persons skilled in the art upon reference to this description. It is therefore contemplated that the appended claims will cover any such modifications or embodiments as may fall within the scope of the invention defined by the following claims and their equivalents.

What is claimed is:

1. A metal-air cell having an anode/electrolyte and a cathode with a separator positioned there-between, said cell comprising:

a container having an upper interior surface and a lower interior surface for housing said anode/electrolyte and said cathode;

a spring disposed on said upper interior surface;

a cover electrically connected to said cathode and having at least one recess; and at least one o-ring disposed on said lower interior surface facing said at least one recess;

wherein said spring is compressed when a force is applied so that said at least one o-ring and said at least one recess are separated, thereby forming an inlet to introduce air for electrochemical reaction; and said spring is expanded when said force is removed so that said at least one o-ring is inserted within said at least one recess to obstruct the air.

2. A metal-air cell as claimed in claim 1, wherein said force is applied by a cell holder.

3. A metal-air cell as claimed in claim 1, wherein said container is a can-shape container.

4. A metal-air cell as claimed in claim 1, further comprising a gas-permeable membrane disposed around said cathode and along interior sidewalls of said container to prevent moisture from exiting the cell.

5. A metal-air cell as claimed in claim 4, wherein said gas-permeable membrane comprises a hydrophobic material.

6. A metal-air cell as claimed in claim 1, wherein said anode comprises zinc.

* * * * *